United States Patent
Seregin et al.

(10) Patent No.: US 10,178,403 B2
(45) Date of Patent: Jan. 8, 2019

(54) REFERENCE PICTURE LIST CONSTRUCTION IN INTRA BLOCK COPY MODE

(71) Applicant: QUALCOMM Incorporated, San Diego, CA (US)

(72) Inventors: Vadim Seregin, San Diego, CA (US); Krishnakanth Rapaka, San Diego, CA (US); Ye-Kui Wang, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 194 days.

(21) Appl. No.: 15/187,694

(22) Filed: Jun. 20, 2016

(65) Prior Publication Data

US 2016/0381373 A1 Dec. 29, 2016

Related U.S. Application Data

(60) Provisional application No. 62/183,676, filed on Jun. 23, 2015.

(51) Int. Cl.
*H04N 11/02* (2006.01)
*H04N 19/503* (2014.01)
*H04N 19/70* (2014.01)
*H04N 19/593* (2014.01)
*H04N 19/573* (2014.01)

(52) U.S. Cl.
CPC ......... *H04N 19/503* (2014.11); *H04N 19/573* (2014.11); *H04N 19/593* (2014.11); *H04N 19/70* (2014.11)

(58) Field of Classification Search
CPC .................................................. H04N 19/503
See application file for complete search history.

(56) References Cited

U.S. PATENT DOCUMENTS 7,483,484 B2 * 1/2009 Liu ...................... G06K 9/3266
375/240
9,621,889 B2 * 4/2017 Sugio ................... H04N 19/573
(Continued)

OTHER PUBLICATIONS

International Search Report and Written Opinion—PCT/US2016/038498—ISA/EPO—dated Sep. 23, 2016.
(Continued)

*Primary Examiner* — Leron Beck
(74) *Attorney, Agent, or Firm* — Shumaker & Sieffert, P.A.

(57) ABSTRACT

An apparatus configured to construct a reference picture list includes a memory and one or more processors in communication with the memory. The memory is configured to store one or more reference pictures. The one or more processors are configured to determine (i) a first number representative of a total number of reference pictures available for prediction in at least one of inter mode or intra block copy mode and (ii) a second number representative of a total number of reference pictures to be included in the reference picture list, and in response to a determination that the second number is greater than or equal to the first number, refrain from replacing a reference picture in the reference picture list with a current picture to be predicted. The one or more processors may encode or decode the current picture based on the reference picture list.

30 Claims, 6 Drawing Sheets

(56) References Cited

U.S. PATENT DOCUMENTS

| | | | | |
|---|---|---|---|---|
| 2008/0232467 | A1* | 9/2008 | Iguchi | H04N 5/85 375/240.12 |
| 2013/0208792 | A1* | 8/2013 | He | H04N 19/00569 375/240.12 |
| 2014/0016699 | A1* | 1/2014 | Chen | H04N 19/70 375/240.12 |
| 2014/0211856 | A1* | 7/2014 | Sugio | H04N 19/70 375/240.16 |
| 2014/0301452 | A1* | 10/2014 | Deshpande | H04N 19/503 375/240.12 |
| 2015/0103898 | A1* | 4/2015 | Ye | H04N 19/70 375/240.12 |
| 2015/0334399 | A1* | 11/2015 | Hendry | H04N 19/105 375/240.12 |
| 2015/0365702 | A1* | 12/2015 | Deshpande | H04N 19/70 375/240.25 |
| 2016/0100189 | A1* | 4/2016 | Pang | H04N 19/593 375/240.13 |
| 2016/0360210 | A1* | 12/2016 | Xiu | H04N 19/176 |
| 2017/0289566 | A1* | 10/2017 | He | H04N 19/52 |
| 2017/0310961 | A1* | 10/2017 | Liu | H04N 19/107 |

OTHER PUBLICATIONS

Josh R., et al., "HEVC Screen Content Coding Draft Text 3",20. JCTVC Meeting; Feb. 10, 2105- Feb. 18, 2015; Geneva; (Joint Collaborative Team on Video Coding of ISO/IEC JTC1 /SC29/ WG11 and ITU-T SG.16 ); URL: http:/iwftp3.1tu.int/av-arch/jctvc-site/, No. JCTVC-T1 005-v2, Mar. 31, 2015 (Mar. 31, 2015), XP030117413.

Li B., et al., °Non-SCCE1: Unification of Intra BC and Inter Modes, 18. JCT-VC Meeting; Jun. 30, 2014-Jul. 9, 2014; Sapporo; (Joint Collaborative Team on Video Coding of ISO/IEC JTC1/SC29/ WG11 and ITU-T SG.16 ); URL: http://wftp3.itu.int/av-arch/jctvc-site/,, No. JCTVC-R0100-v2, Jun. 29, 2014 (Jun. 29, 2014), XP030116357.

Pang C., et al., "Non-CE2 : Intra Block Copy with Inter Signaling", 19. JCT-VC Meeting; Oct. 17, 2014-Oct. 24, 2014; Strasbourg; (Joint Collaborative Team on Video Coding of ISO/IEC JTC1/SC29/ WG11 and ITU-T SG .16 ); URL: http://wftp3 . itu.int/av-arch/ jctvc-site/,, No. JCTVC-S0113-v4, Oct. 21, 2014 (Oct. 21, 2014), XP030116869, 3 pages.

Rapaka K et al: "Combination of JCTVC-U0118 method 2.2 and JCTVC-U0113 method 1" ,21. JCT-VC Meeting; Jun. 19, 2015-Jun. 25, 2015; Warsaw; (Joint Collaborative Team on Video Coding of ISO/IEC JTC1/SC29/WG11 and ITU-T SG.16 ) ; URL: http://wftp3. itu.int/av-arch/jctvc-site/,,No. JCTVC-U0180, Jun. 22, 2015 (Jun. 22, 2015), XP030117627, the whole document.

Seregin V., et al., "On Intra Block Copy Bitstream Constraints",21. JCT-VC Meeting; Jun. 19, 2015-Jun. 25, 2015 ; Warsaw; (Joint Collaborative Team on Video Coding of ISO/IEC JTC1/SC29/ WG11 and ITU-T SG.16 ); URL: http ://wftp3.itu.int/av-arch/jctvc-site/,, No. JCTVC-U0118, Jun. 10, 2015 (Jun. 10, 2015), XP030117558, 4 pages.

Xu X., et al., "On reference picture list construction for intra block copy", 21. JCT-VC Meeting; Jun. 19, 2015-Jun. 26, 2015 ; Warsaw; (Joint Collaborative Team on Video Coding of ISO/IEC JTC1/SC29/ WG11 and ITU-T SG.16 ); URL: http:/iwftp3.1tu.int/av-arch/jctvc-site/, No. JCTVC-U0113, Jun. 10, 2015 (Jun. 10, 2015), XP030117551, 6 pages.

International Preliminary Report on Patentability from International Application No. PCT/US2016/038498, dated Jan. 4, 2018, 11 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

* cited by examiner

REFERENCE PICTURE LIST CONSTRUCTION IN INTRA BLOCK COPY MODE

INCORPORATION BY REFERENCE TO PRIORITY APPLICATION

This application claims the benefit of U.S. Provisional Application No. 62/183,676, filed Jun. 23, 2015, which is hereby incorporated by reference under 37 CFR 1.57.

TECHNICAL FIELD

This disclosure relates to the field of video coding and compression, and particularly to screen content coding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by Moving Picture Experts Group-2 (MPEG-2), MPEG-4, International Telegraph Union-Telecommunication Standardization Sector (ITU-T) H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video coding techniques.

With the prevalence of high speed Internet access, emerging video applications such as remote desktop sharing, virtual desktop infrastructure, and wireless display require high compression efficiency of screen contents. However, additional intra and inter video coding tools were designed primarily for natural contents. Screen contents have significantly different characteristics compared with natural contents (e.g., sharp edges and less or no noise), which makes those traditional coding tools less sufficient.

SUMMARY

In video coding, previously decoded pictures can be used as predictors for coding other pictures. Such previously decoded pictures may be added to a reference picture list and referenced within the reference picture using reference indices. Such a reference picture list may be used for coding a picture, a slice, or a block in inter mode, where temporally neighboring pictures may be added to the reference picture and used as predictors for a current picture/slice/block. In some cases, such a reference picture list may also be used for coding a picture/slice/block in intra block copy mode, where previously reconstructed blocks within a picture can be used to code another block within the same picture. In such cases, the current picture can be added to the reference picture list and referenced using a reference index.

In some implementations, when intra block copy mode enabled for use, the current picture may always be added to the reference picture list. For example, a coder (e.g., encoder or decoder) may, at the end of the reference picture list construction process, replace one of the reference pictures in the reference picture list with the current picture, so that the current picture can be used for coding a block in inter mode or in intra block copy mode. However, in some cases, automatically adding the current picture to the reference picture list may result in certain disadvantages, even when intra block copy mode is enabled for use.

Thus, an improved reference picture list construction method for inter mode and intra block copy mode is desired.

The systems, methods and devices of this disclosure each have several innovative aspects, no single one of which is solely responsible for the desirable attributes disclosed herein.

In one aspect, a method of constructing a reference picture list comprises determining (i) a first number representative of a total number of reference pictures available for prediction in at least one of inter mode or intra block copy mode and (ii) a second number representative of a total number of reference pictures to be included in the reference picture list, and in response to determining that the second number is greater than or equal to the first number, refraining from replacing a reference picture in the reference picture list with a current picture to be predicted.

In another aspect, an apparatus for constructing a reference picture list includes a memory and one or more processors in communication with the memory. The memory is configured to store video one or more reference pictures. The one or more processors are configured to determine (i) a first number representative of a total number of reference pictures available for prediction in at least one of inter mode or intra block copy mode and (ii) a second number representative of a total number of reference pictures to be included in the reference picture list, and in response to a determination that the second number is greater than or equal to the first number, refrain from replacing a reference picture in the reference picture list with a current picture to be predicted.

In another aspect, non-transitory physical computer storage comprises code that, when executed, causes an apparatus to determine (i) a first number representative of a total number of reference pictures available for prediction in at least one of inter mode or intra block copy mode and (ii) a second number representative of a total number of reference pictures to be included in a reference picture list, and in response to a determination that the second number is greater than or equal to the first number, refrain from replacing a reference picture in the reference picture list with a current picture to be predicted.

In another aspect, a video coding device configured to construct a reference picture list comprises means for storing one or more reference pictures, means for determining (i) a first number representative of a total number of reference pictures available for prediction in at least one of inter mode or intra block copy mode and (ii) a second number representative of a total number of reference pictures to be included in the reference picture list, and means for refraining, in response to a determination that the second number is greater than or equal to the first number, from replacing a reference picture in the reference picture list with a current picture to be predicted.

DETAILED DESCRIPTION

Figure 1A:
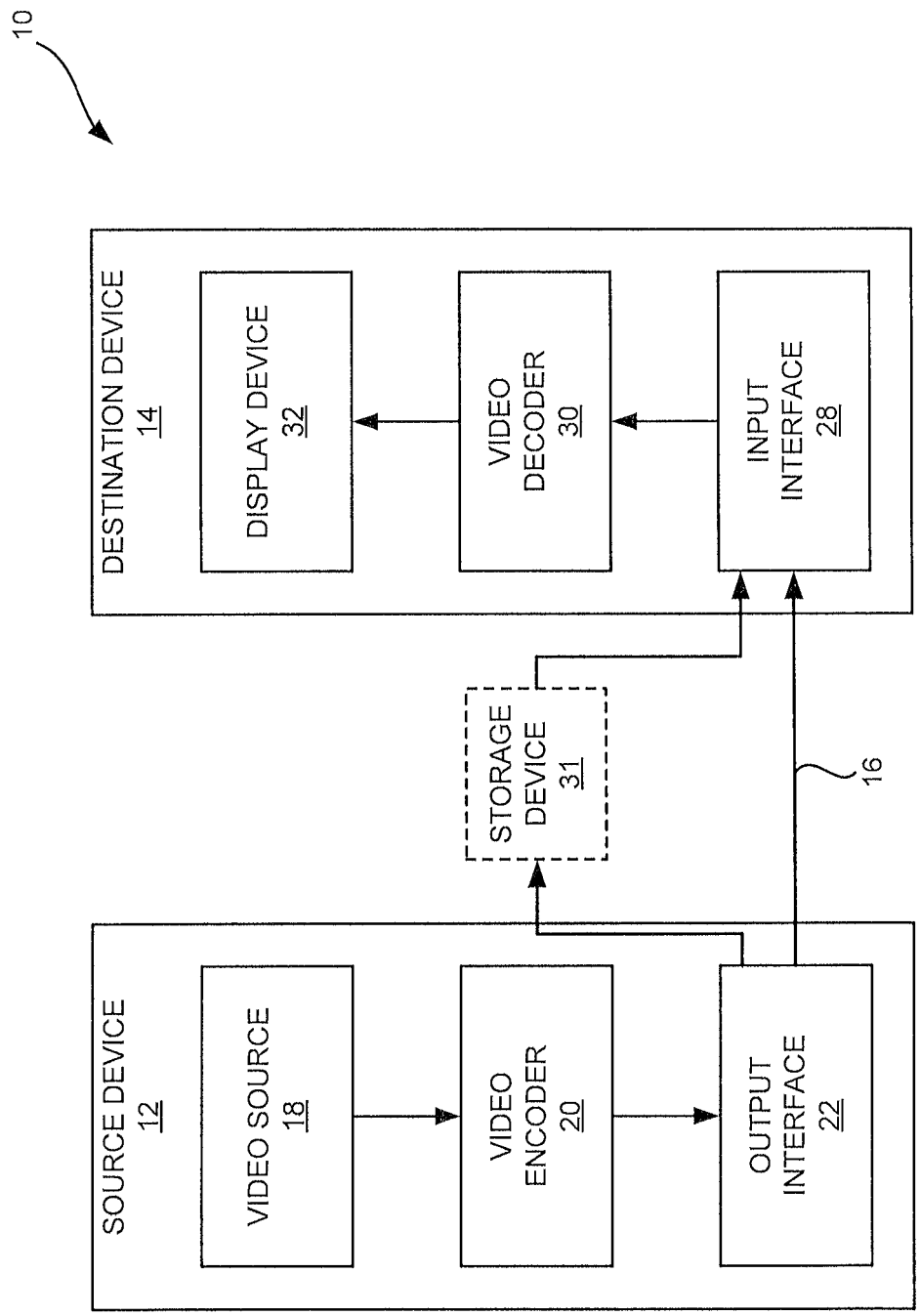
FIG. 1A is a block diagram illustrating an example video encoding and decoding system that may utilize techniques in accordance with aspects described in this disclosure.

In the description below, H.264/Advanced Video Coding (AVC) techniques related to certain embodiments are described, and the HEVC standard and related techniques are also discussed. While certain embodiments are described herein in the context of the HEVC and/or H.264 standards, one having ordinary skill in the art would appreciate that systems and methods disclosed herein may be applicable to any suitable video coding standard. For example, embodiments disclosed herein may be applicable to one or more of the following standards: International Telecommunication Union (ITU) Telecommunication Standardization Sector (ITU-T) H.261, International Organization for Standardization/International Electrotechnical Commission (ISO/IEC) MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including the range extension.

HEVC generally follows the framework of previous video coding standards in many respects. The unit of prediction in HEVC is different from the units of prediction (e.g., macroblocks) in certain previous video coding standards. In fact, the concept of a macroblock does not exist in HEVC as understood in certain previous video coding standards. A macroblock is replaced by a hierarchical structure based on a quadtree scheme, which may provide high flexibility, among other possible benefits. For example, within the HEVC scheme, three types of blocks, Coding Unit (CU), Prediction Unit (PU), and Transform Unit (TU), are defined. CU may refer to the basic unit of region splitting. CU may be considered analogous to the concept of macroblock, but HEVC does not restrict the maximum size of CUs and may allow recursive splitting into four equal size CUs to improve the content adaptivity. PU may be considered the basic unit of inter/intra prediction, and a single PU may contain multiple arbitrary shape partitions to effectively code irregular image patterns. TU may be considered the basic unit of transform. TU can be defined independently from the PU; however, the size of a TU may be limited to the size of the CU to which the TU belongs. This separation of the block structure into three different concepts may allow each unit to be optimized according to the respective role of the unit, which may result in improved coding efficiency.

Video Coding Standards

A digital image, such as a video image, a TV image, a still image or an image generated by a video recorder or a computer, may include pixels or samples arranged in horizontal and vertical lines. The number of pixels in a single image is typically in the tens of thousands. Each pixel typically contains luminance and chrominance information. Without compression, the sheer quantity of information to be conveyed from an image encoder to an image decoder would render real-time image transmission impractical. To reduce the amount of information to be transmitted, a number of different compression methods, such as JPEG, MPEG and H.263 standards, have been developed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

In addition, a video coding standard, namely HEVC, has been developed by the Joint Collaboration Team on Video Coding (JCT-VC) of ITU-T Video Coding Experts Group (VCEG) and ISO/IEC MPEG. The HEVC specification is available on the ITU website under the title "Recommendation ITU-T H.265." A draft of HEVC screen content coding is available on the JCT-VC document management system at document number JCTVC-W0105-v3.

Initial Considerations

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the present disclosure. For example, an apparatus may be implemented or a method may be practiced using any number of the aspects set forth herein. In addition, the scope of the present disclosure is intended to cover such an apparatus or method which is practiced using other structure, functionality, or structure and functionality in addition to or other than the various aspects of the present disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

Video Coding System

FIG. 1A is a block diagram that illustrates an example video coding system 10 that may utilize techniques in accordance with aspects described in this disclosure. As used described herein, the term "video coder" or "coder" refers generically to both video encoders and video decoders. In this disclosure, the terms "video coding" or "coding" may refer generically to video encoding and video decoding. In addition to video encoders and video decoders, the aspects described in the present application may be extended to other related devices such as transcoders (e.g., devices that can decode a bitstream and re-encode another bitstream) and middleboxes (e.g., devices that can modify, transform, and/or otherwise manipulate a bitstream).

Figure 1B:
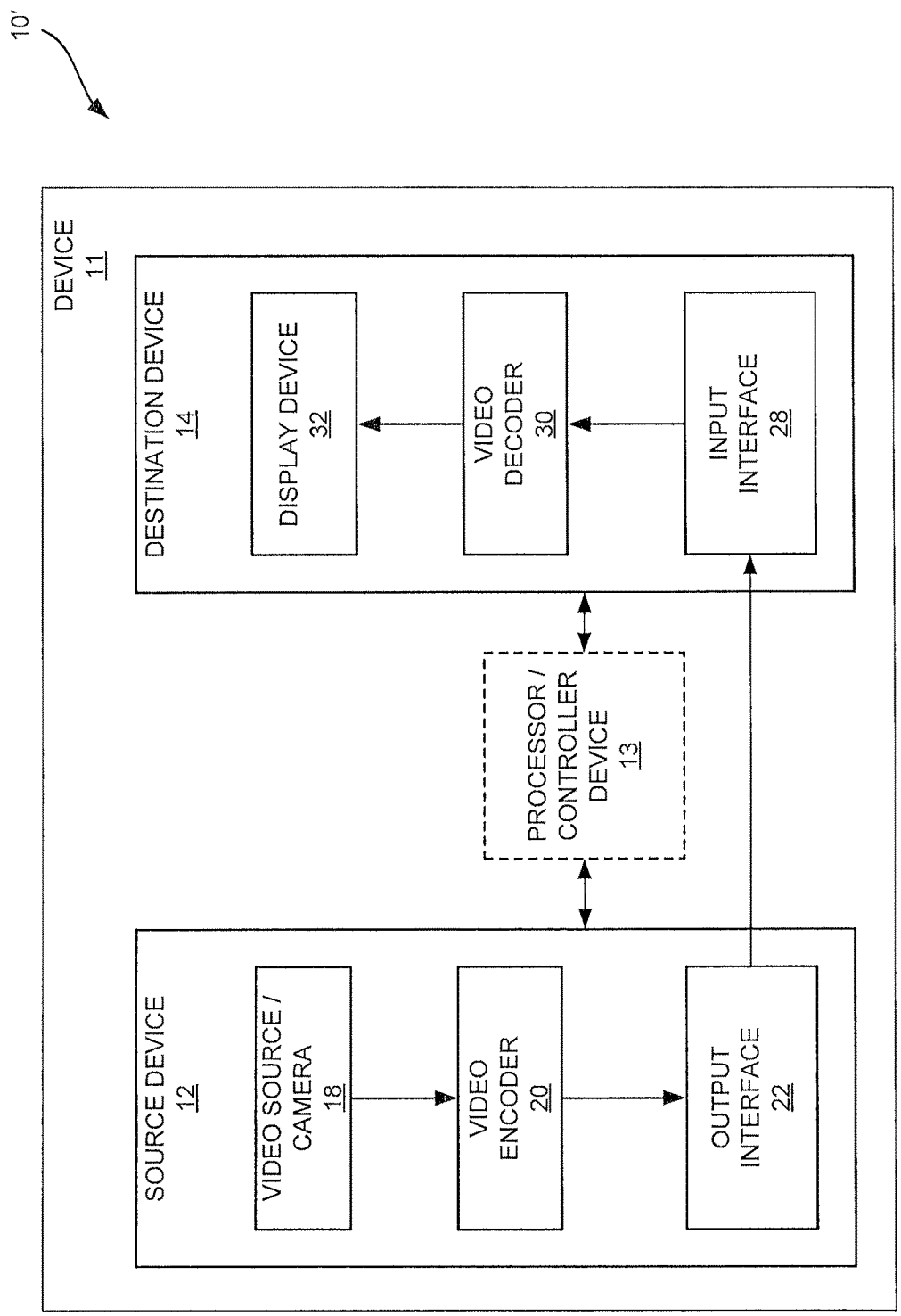
FIG. 1B is a block diagram illustrating another example video encoding and decoding system that may perform techniques in accordance with aspects described in this disclosure.

As shown in FIG. 1A, video coding system 10 includes a source device 12 that generates encoded video data to be decoded at a later time by a destination device 14. In the example of FIG. 1A, the source device 12 and destination device 14 constitute separate devices. It is noted, however, that the source device 12 and destination device 14 may be on or part of the same device, as shown in the example of FIG. 1B.

With reference once again, to FIG. 1A, the source device 12 and the destination device 14 may respectively comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In various embodiments, the source device 12 and the destination device 14 may be equipped for wireless communication.

The destination device 14 may receive, via link 16, the encoded video data to be decoded. The link 16 may comprise any type of medium or device capable of moving the encoded video data from the source device 12 to the destination device 14. In the example of FIG. 1A, the link 16 may comprise a communication medium to enable the source device 12 to transmit encoded video data to the destination device 14 in real-time. The encoded video data may be modulated according to a communication standard, such as a wireless communication protocol, and transmitted to the destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

Alternatively, encoded data may be output from an output interface 22 to a storage device 31 (optionally present). Similarly, encoded data may be accessed from the storage device 31 by an input interface 28, for example, of the destination device 14. The storage device 31 may include any of a variety of distributed or locally accessed data storage media such as a hard drive, flash memory, volatile or non-volatile memory, or any other suitable digital storage media for storing encoded video data. In a further example, the storage device 31 may correspond to a file server or another intermediate storage device that may hold the encoded video generated by the source device 12. The destination device 14 may access stored video data from the storage device 31 via streaming or download. The file server may be any type of server capable of storing encoded video data and transmitting that encoded video data to the destination device 14. Example file servers include a web server (e.g., for a website), a File Transfer Protocol (FTP) server, network attached storage (NAS) devices, or a local disk drive. The destination device 14 may access the encoded video data through any standard data connection, including an Internet connection. This may include a wireless channel (e.g., a wireless local area network (WLAN) connection), a wired connection (e.g., a digital subscriber line (DSL), a cable modem, etc.), or a combination of both that is suitable for accessing encoded video data stored on a file server. The transmission of encoded video data from the storage device 31 may be a streaming transmission, a download transmission, or a combination of both.

The techniques of this disclosure are not limited to wireless applications or settings. The techniques may be applied to video coding in support of any of a variety of multimedia applications, such as over-the-air television broadcasts, cable television transmissions, satellite television transmissions, streaming video transmissions, e.g., via the Internet (e.g., dynamic adaptive streaming over Hyper-text Transfer Protocol [HTTP], etc.), encoding of digital video for storage on a data storage medium, decoding of digital video stored on a data storage medium, or other applications. In some examples, video coding system 10 may be configured to support one-way or two-way video transmission to support applications such as video streaming, video playback, video broadcasting, and/or video telephony.

In the example of FIG. 1A, the source device 12 includes a video source 18, video encoder 20 and the output interface 22. In some cases, the output interface 22 may include a modulator/demodulator (modem) and/or a transmitter. In the source device 12, the video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called "camera phones" or "video phones", as illustrated in the example of FIG. 1B. However, the techniques described in this disclosure may be applicable to video coding in general, and may be applied to wireless and/or wired applications.

The captured, pre-captured, or computer-generated video may be encoded by the video encoder 20. The encoded video data may be transmitted to the destination device 14 via the output interface 22 of the source device 12. The encoded video data may also (or alternatively) be stored onto the storage device 31 for later access by the destination device 14 or other devices, for decoding and/or playback. The video encoder 20 illustrated in FIGS. 1A and 1B may comprise the video encoder 20 illustrated FIG. 2 or any other video encoder described herein.

In the example of FIG. 1A, the destination device 14 includes the input interface 28, a video decoder 30, and a display device 32. In some cases, the input interface 28 may include a receiver and/or a modem. The input interface 28 of the destination device 14 may receive the encoded video data over the link 16 and/or from the storage device 31. The encoded video data communicated over the link 16, or provided on the storage device 31, may include a variety of syntax elements generated by the video encoder 20 for use by a video decoder, such as the video decoder 30, in decoding the video data. Such syntax elements may be included with the encoded video data transmitted on a communication medium, stored on a storage medium, or stored a file server. The video decoder 30 illustrated in FIGS. 1A and 1B may comprise the video decoder 30 illustrated FIG. 3 or any other video decoder described herein.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In related aspects, FIG. 1B shows an example video coding system 10' wherein the source device 12 and the destination device 14 are on or part of a device 11. The device 11 may be a telephone handset, such as a "smart" phone or the like. The device 11 may include a controller/processor device 13 (optionally present) in operative communication with the source device 12 and the destination device 14. The video coding system 10' of FIG. 1B, and components thereof, are otherwise similar to the video coding system 10 of FIG. 1A, and components thereof.

The video encoder 20 and the video decoder 30 may operate according to a video compression standard, such as HEVC, and may conform to a HEVC Test Model (HM). Alternatively, the video encoder 20 and the video decoder 30 may operate according to other proprietary or industry standards, such as the ITU-T H.264 standard, alternatively referred to as MPEG-4, Part 10, AVC, or extensions of such standards. The techniques of this disclosure, however, are not limited to any particular coding standard. Other examples of video compression standards include MPEG-2 and ITU-T H.263.

Although not shown in the examples of FIGS. 1A and 1B, the video encoder 20 and the video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder in a respective device.

Video Coding Process

As mentioned briefly above, the video encoder 20 encodes video data. The video data may comprise one or more pictures. Each of the pictures is a still image forming part of a video. In some instances, a picture may be referred to as a video "frame." When the video encoder 20 encodes the video data, the video encoder 20 may generate a bitstream. The bitstream may include a sequence of bits that form a coded representation of the video data. The bitstream may include coded pictures and associated data. A coded picture is a coded representation of a picture.

To generate the bitstream, the video encoder 20 may perform encoding operations on each picture in the video data. When the video encoder 20 performs encoding operations on the pictures, the video encoder 20 may generate a series of coded pictures and associated data. The associated data may include video parameter sets (VPS), sequence parameter sets (SPSs), picture parameter sets (PPSs), adaptation parameter sets (APSs), and other syntax structures. An SPS may contain parameters applicable to zero or more sequences of pictures. A PPS may contain parameters applicable to zero or more pictures. An APS may contain parameters applicable to zero or more pictures. Parameters in an APS may be parameters that are more likely to change than parameters in a PPS.

To generate a coded picture, the video encoder 20 may partition a picture into equally-sized video blocks. A video block may be a two-dimensional array of samples. Each of the video blocks is associated with a treeblock. In some instances, a treeblock may be referred to as a largest coding unit (LCU). The treeblocks of HEVC may be broadly analogous to the macroblocks of previous standards, such as H.264/AVC. However, a treeblock is not necessarily limited to a particular size and may include one or more coding units (CUs). The video encoder 20 may use quadtree partitioning to partition the video blocks of treeblocks into video blocks associated with CUs, hence the name "treeblocks."

In some examples, the video encoder 20 may partition a picture into a plurality of slices. Each of the slices may include an integer number of CUs. In some instances, a slice comprises an integer number of treeblocks. In other instances, a boundary of a slice may be within a treeblock.

As part of performing an encoding operation on a picture, the video encoder 20 may perform encoding operations on each slice of the picture. When the video encoder 20 performs an encoding operation on a slice, the video encoder 20 may generate encoded data associated with the slice. The encoded data associated with the slice may be referred to as a "coded slice."

To generate a coded slice, the video encoder 20 may perform encoding operations on each treeblock in a slice. When the video encoder 20 performs an encoding operation on a treeblock, the video encoder 20 may generate a coded treeblock. The coded treeblock may comprise data representing an encoded version of the treeblock.

When the video encoder 20 generates a coded slice, the video encoder 20 may perform encoding operations on (e.g., encode) the treeblocks in the slice according to a raster scan order. For example, the video encoder 20 may encode the treeblocks of the slice in an order that proceeds from left to right across a topmost row of treeblocks in the slice, then from left to right across a next lower row of treeblocks, and so on until the video encoder 20 has encoded each of the treeblocks in the slice.

As a result of encoding the treeblocks according to the raster scan order, the treeblocks above and to the left of a given treeblock may have been encoded, but treeblocks below and to the right of the given treeblock have not yet been encoded. Consequently, the video encoder 20 may be able to access information generated by encoding treeblocks above and to the left of the given treeblock when encoding the given treeblock. However, the video encoder 20 may be unable to access information generated by encoding treeblocks below and to the right of the given treeblock when encoding the given treeblock.

To generate a coded treeblock, the video encoder 20 may recursively perform quadtree partitioning on the video block of the treeblock to divide the video block into progressively smaller video blocks. Each of the smaller video blocks may be associated with a different CU. For example, the video encoder 20 may partition the video block of a treeblock into four equally-sized sub-blocks, partition one or more of the sub-blocks into four equally-sized sub-sub-blocks, and so on. A partitioned CU may be a CU whose video block is partitioned into video blocks associated with other CUs. A non-partitioned CU may be a CU whose video block is not partitioned into video blocks associated with other CUs.

One or more syntax elements in the bitstream may indicate a maximum number of times the video encoder 20 may partition the video block of a treeblock. A video block of a CU may be square in shape. The size of the video block of a CU (e.g., the size of the CU) may range from 8×8 pixels up to the size of a video block of a treeblock (e.g., the size of the treeblock) with a maximum of 64×64 pixels or greater.

The video encoder 20 may perform encoding operations on (e.g., encode) each CU of a treeblock according to a z-scan order. In other words, the video encoder 20 may encode a top-left CU, a top-right CU, a bottom-left CU, and then a bottom-right CU, in that order. When the video encoder 20 performs an encoding operation on a partitioned CU, the video encoder 20 may encode CUs associated with sub-blocks of the video block of the partitioned CU according to the z-scan order. In other words, the video encoder 20 may encode a CU associated with a top-left sub-block, a CU associated with a top-right sub-block, a CU associated with a bottom-left sub-block, and then a CU associated with a bottom-right sub-block, in that order.

As a result of encoding the CUs of a treeblock according to a z-scan order, the CUs above, above-and-to-the-left, above-and-to-the-right, left, and below-and-to-the left of a given CU may have been encoded. CUs below and to the right of the given CU have not yet been encoded. Consequently, the video encoder 20 may be able to access information generated by encoding some CUs that neighbor the given CU when encoding the given CU. However, the video encoder 20 may be unable to access information generated by encoding other CUs that neighbor the given CU when encoding the given CU.

When the video encoder 20 encodes a non-partitioned CU, the video encoder 20 may generate one or more prediction units (PUs) for the CU. Each of the PUs of the CU may be associated with a different video block within the video block of the CU. The video encoder 20 may generate a predicted video block for each PU of the CU. The predicted video block of a PU may be a block of samples. The video encoder 20 may use intra prediction or inter prediction to generate the predicted video block for a PU.

When the video encoder 20 uses intra prediction to generate the predicted video block of a PU, the video encoder 20 may generate the predicted video block of the PU based on decoded samples of the picture associated with the PU. If the video encoder 20 uses intra prediction to generate predicted video blocks of the PUs of a CU, the CU is an intra-predicted CU. When the video encoder 20 uses inter prediction to generate the predicted video block of the PU, the video encoder 20 may generate the predicted video block of the PU based on decoded samples of one or more pictures other than the picture associated with the PU. If the video encoder 20 uses inter prediction to generate predicted video blocks of the PUs of a CU, the CU is an inter-predicted CU.

Furthermore, when the video encoder 20 uses inter prediction to generate a predicted video block for a PU, the video encoder 20 may generate motion information for the PU. The motion information for a PU may indicate one or more reference blocks of the PU. Each reference block of the PU may be a video block within a reference picture. The reference picture may be a picture other than the picture associated with the PU. In some instances, a reference block of a PU may also be referred to as the "reference sample" of the PU. The video encoder 20 may generate the predicted video block for the PU based on the reference blocks of the PU.

After the video encoder 20 generates predicted video blocks for one or more PUs of a CU, the video encoder 20 may generate residual data for the CU based on the predicted video blocks for the PUs of the CU. The residual data for the CU may indicate differences between samples in the predicted video blocks for the PUs of the CU and the original video block of the CU.

Furthermore, as part of performing an encoding operation on a non-partitioned CU, the video encoder 20 may perform recursive quadtree partitioning on the residual data of the CU to partition the residual data of the CU into one or more blocks of residual data (e.g., residual video blocks) associated with transform units (TUs) of the CU. Each TU of a CU may be associated with a different residual video block.

The video encoder 20 may apply one or more transforms to residual video blocks associated with the TUs to generate transform coefficient blocks (e.g., blocks of transform coefficients) associated with the TUs. Conceptually, a transform coefficient block may be a two-dimensional (2D) matrix of transform coefficients.

After generating a transform coefficient block, the video encoder 20 may perform a quantization process on the transform coefficient block. Quantization generally refers to a process in which transform coefficients are quantized to possibly reduce the amount of data used to represent the transform coefficients, providing further compression. The quantization process may reduce the bit depth associated with some or all of the transform coefficients. For example, an n-bit transform coefficient may be rounded down to an m-bit transform coefficient during quantization, where n is greater than m.

The video encoder 20 may associate each CU with a quantization parameter (QP) value. The QP value associated with a CU may determine how the video encoder 20 quantizes transform coefficient blocks associated with the CU. The video encoder 20 may adjust the degree of quantization applied to the transform coefficient blocks associated with a CU by adjusting the QP value associated with the CU.

After the video encoder 20 quantizes a transform coefficient block, the video encoder 20 may generate sets of syntax elements that represent the transform coefficients in the quantized transform coefficient block. The video encoder 20 may apply entropy encoding operations, such as Context Adaptive Binary Arithmetic Coding (CABAC) operations, to some of these syntax elements. Other entropy coding techniques such as context-adaptive variable-length coding (CAVLC), probability interval partitioning entropy (PIPE) coding, or other binary arithmetic coding could also be used.

The bitstream generated by the video encoder 20 may include a series of Network Abstraction Layer (NAL) units. Each of the NAL units may be a syntax structure containing an indication of a type of data in the NAL unit and bytes containing the data. For example, a NAL unit may contain data representing a video parameter set, a sequence parameter set, a picture parameter set, a coded slice, SEI, an access unit delimiter, filler data, or another type of data. The data in a NAL unit may include various syntax structures.

The video decoder 30 may receive the bitstream generated by the video encoder 20. The bitstream may include a coded representation of the video data encoded by the video encoder 20. When the video decoder 30 receives the bitstream, the video decoder 30 may perform a parsing operation on the bitstream. When the video decoder 30 performs the parsing operation, the video decoder 30 may extract syntax elements from the bitstream. The video decoder 30 may reconstruct the pictures of the video data based on the syntax elements extracted from the bitstream. The process to reconstruct the video data based on the syntax elements may be generally reciprocal to the process performed by the video encoder 20 to generate the syntax elements.

After the video decoder 30 extracts the syntax elements associated with a CU, the video decoder 30 may generate predicted video blocks for the PUs of the CU based on the syntax elements. In addition, the video decoder 30 may inverse quantize transform coefficient blocks associated with TUs of the CU. The video decoder 30 may perform inverse transforms on the transform coefficient blocks to reconstruct residual video blocks associated with the TUs of the CU. After generating the predicted video blocks and reconstructing the residual video blocks, the video decoder 30 may reconstruct the video block of the CU based on the predicted video blocks and the residual video blocks. In this way, the video decoder 30 may reconstruct the video blocks of CUs based on the syntax elements in the bitstream.

Video Encoder

Figure 2:
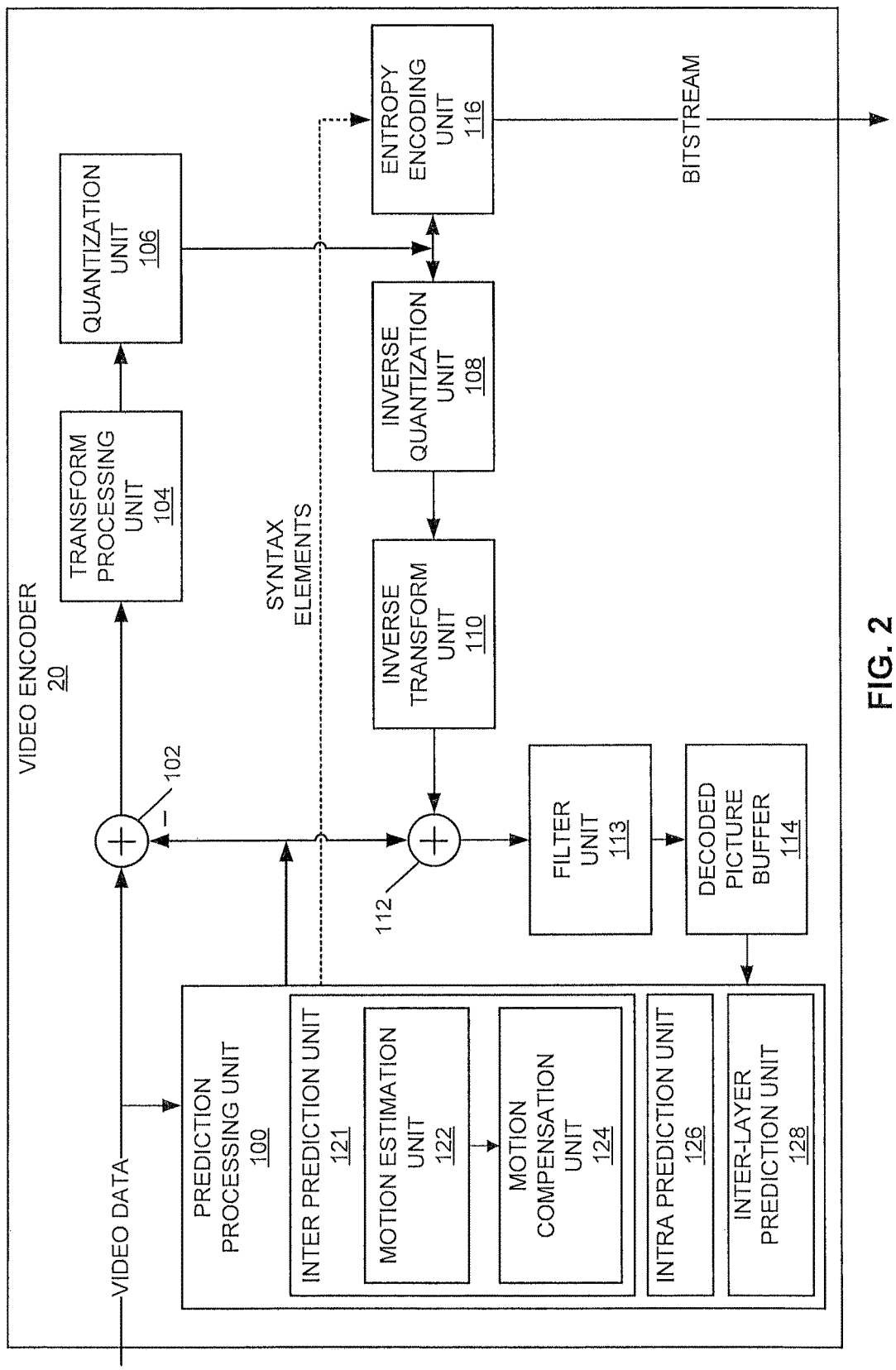
FIG. 2 is a block diagram illustrating an example of a video encoder that may implement techniques in accordance with aspects described in this disclosure.

FIG. 2 is a block diagram illustrating an example of the video encoder 20 that may implement techniques in accordance with aspects described in this disclosure. The video encoder 20 may be configured to process a single layer of a video frame, such as for HEVC. Further, the video encoder 20 may be configured to perform any or all of the techniques of this disclosure. In some examples, the techniques described in this disclosure may be shared among the various components of the video encoder 20. In some examples, additionally or alternatively, a processor (not shown) may be configured to perform any or all of the techniques described in this disclosure.

For purposes of explanation, this disclosure describes the video encoder 20 in the context of HEVC coding. However, the techniques of this disclosure may be applicable to other coding standards or methods. The example depicted in FIG. 2 is for a single layer codec. However, in certain embodiments, some or all of the video encoder 20 may be duplicated for processing of a multi-layer codec.

The video encoder 20 may perform intra- and inter-coding of video blocks within video slices. Intra coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-directional prediction (B mode), may refer to any of several temporal-based coding modes.

In the example of FIG. 2, the video encoder 20 includes a plurality of functional components. The functional components of the video encoder 20 include a prediction processing unit 100, a residual generation unit 102, a transform processing unit 104, a quantization unit 106, an inverse quantization unit 108, an inverse transform unit 110, a reconstruction unit 112, a filter unit 113, a decoded picture buffer 114, and an entropy encoding unit 116. Prediction processing unit 100 includes an inter prediction unit 121, a motion estimation unit 122, a motion compensation unit 124, an intra prediction unit 126, and an inter-layer prediction unit 128. In other examples, the video encoder 20 may include more, fewer, or different functional components. Furthermore, motion estimation unit 122 and motion compensation unit 124 may be highly integrated, but are represented in the example of FIG. 2 separately for purposes of explanation.

The video encoder 20 may receive video data. The video encoder 20 may receive the video data from various sources. For example, the video encoder 20 may receive the video data from video source 18 (e.g., shown in FIG. 1A or 1B) or another source. The video data may represent a series of pictures. To encode the video data, the video encoder 20 may perform an encoding operation on each of the pictures. As part of performing the encoding operation on a picture, the video encoder 20 may perform encoding operations on each slice of the picture. As part of performing an encoding operation on a slice, the video encoder 20 may perform encoding operations on treeblocks in the slice.

As part of performing an encoding operation on a treeblock, prediction processing unit 100 may perform quadtree partitioning on the video block of the treeblock to divide the video block into progressively smaller video blocks. Each of the smaller video blocks may be associated with a different CU. For example, prediction processing unit 100 may partition a video block of a treeblock into four equally-sized sub-blocks, partition one or more of the sub-blocks into four equally-sized sub-sub-blocks, and so on.

The sizes of the video blocks associated with CUs may range from 8×8 samples up to the size of the treeblock with a maximum of 64×64 samples or greater. In this disclosure, "N×N" and "N by N" may be used interchangeably to refer to the sample dimensions of a video block in terms of vertical and horizontal dimensions, e.g., 16×16 samples or 16 by 16 samples. In general, a 16×16 video block has sixteen samples in a vertical direction (y=16) and sixteen samples in a horizontal direction (x=16). Likewise, an N×N block generally has N samples in a vertical direction and N samples in a horizontal direction, where N represents a nonnegative integer value.

Furthermore, as part of performing the encoding operation on a treeblock, prediction processing unit 100 may generate a hierarchical quadtree data structure for the treeblock. For example, a treeblock may correspond to a root node of the quadtree data structure. If prediction processing unit 100 partitions the video block of the treeblock into four sub-blocks, the root node has four child nodes in the quadtree data structure. Each of the child nodes corresponds to a CU associated with one of the sub-blocks. If prediction processing unit 100 partitions one of the sub-blocks into four sub-sub-blocks, the node corresponding to the CU associated with the sub-block may have four child nodes, each of which corresponds to a CU associated with one of the sub-sub-blocks.

Each node of the quadtree data structure may contain syntax data (e.g., syntax elements) for the corresponding treeblock or CU. For example, a node in the quadtree may include a split flag that indicates whether the video block of the CU corresponding to the node is partitioned (e.g., split) into four sub-blocks. Syntax elements for a CU may be defined recursively, and may depend on whether the video block of the CU is split into sub-blocks. A CU whose video block is not partitioned may correspond to a leaf node in the quadtree data structure. A coded treeblock may include data based on the quadtree data structure for a corresponding treeblock.

The video encoder 20 may perform encoding operations on each non-partitioned CU of a treeblock. When the video encoder 20 performs an encoding operation on a non-partitioned CU, the video encoder 20 generates data representing an encoded representation of the non-partitioned CU.

As part of performing an encoding operation on a CU, prediction processing unit 100 may partition the video block of the CU among one or more PUs of the CU. The video encoder 20 and the video decoder 30 may support various PU sizes. Assuming that the size of a particular CU is 2N×2N, the video encoder 20 and the video decoder 30 may support PU sizes of 2N×2N or N×N, and inter-prediction in symmetric PU sizes of 2N×2N, 2N×N, N×2N, N×N, 2N×nU, nL×2N, nR×2N, or similar. The video encoder 20 and the video decoder 30 may also support asymmetric partitioning for PU sizes of 2N×nU, 2N×nD, nL×2N, and nR×2N. In some examples, prediction processing unit 100 may perform geometric partitioning to partition the video block of a CU among PUs of the CU along a boundary that does not meet the sides of the video block of the CU at right angles.

Inter prediction unit 121 may perform inter prediction on each PU of the CU. Inter prediction may provide temporal compression. To perform inter prediction on a PU, motion estimation unit 122 may generate motion information for the PU. Motion compensation unit 124 may generate a predicted video block for the PU based the motion information and decoded samples of pictures other than the picture associated with the CU (e.g., reference pictures). In this disclosure, a predicted video block generated by motion compensation unit 124 may be referred to as an inter-predicted video block.

Slices may be I slices, P slices, or B slices. Motion estimation unit 122 and motion compensation unit 124 may perform different operations for a PU of a CU depending on whether the PU is in an I slice, a P slice, or a B slice. In an I slice, all PUs are intra predicted. Hence, if the PU is in an I slice, motion estimation unit 122 and motion compensation unit 124 do not perform inter prediction on the PU.

If the PU is in a P slice, the picture containing the PU is associated with a list of reference pictures referred to as "list 0." Each of the reference pictures in list 0 contains samples that may be used for inter prediction of other pictures. When motion estimation unit 122 performs the motion estimation operation with regard to a PU in a P slice, motion estimation unit 122 may search the reference pictures in list 0 for a reference block for the PU. The reference block of the PU may be a set of samples, e.g., a block of samples that most closely corresponds to the samples in the video block of the PU. Motion estimation unit 122 may use a variety of metrics to determine how closely a set of samples in a reference picture corresponds to the samples in the video block of a PU. For example, motion estimation unit 122 may determine how closely a set of samples in a reference picture corresponds to the samples in the video block of a PU by sum of absolute difference (SAD), sum of square difference (SSD), or other difference metrics.

After identifying a reference block of a PU in a P slice, motion estimation unit 122 may generate a reference index that indicates the reference picture in list 0 containing the reference block and a motion vector that indicates a spatial displacement between the PU and the reference block. In various examples, motion estimation unit 122 may generate motion vectors to varying degrees of precision. For example, motion estimation unit 122 may generate motion vectors at one-quarter sample precision, one-eighth sample precision, or other fractional sample precision. In the case of fractional sample precision, reference block values may be interpolated from integer-position sample values in the reference picture. Motion estimation unit 122 may output the reference index and the motion vector as the motion information of the PU. Motion compensation unit 124 may generate a predicted video block of the PU based on the reference block identified by the motion information of the PU.

If the PU is in a B slice, the picture containing the PU may be associated with two lists of reference pictures, referred to as "list 0" and "list 1." In some examples, a picture containing a B slice may be associated with a list combination that is a combination of list 0 and list 1.

Furthermore, if the PU is in a B slice, motion estimation unit 122 may perform uni-directional prediction or bi-directional prediction for the PU. When motion estimation unit 122 performs uni-directional prediction for the PU, motion estimation unit 122 may search the reference pictures of list 0 or list 1 for a reference block for the PU. Motion estimation unit 122 may then generate a reference index that indicates the reference picture in list 0 or list 1 that contains the reference block and a motion vector that indicates a spatial displacement between the PU and the reference block. Motion estimation unit 122 may output the reference index, a prediction direction indicator, and the motion vector as the motion information of the PU. The prediction direction indicator may indicate whether the reference index indicates a reference picture in list 0 or list 1. Motion compensation unit 124 may generate the predicted video block of the PU based on the reference block indicated by the motion information of the PU.

When motion estimation unit 122 performs bi-directional prediction for a PU, motion estimation unit 122 may search the reference pictures in list 0 for a reference block for the PU and may also search the reference pictures in list 1 for another reference block for the PU. Motion estimation unit 122 may then generate reference indexes that indicate the reference pictures in list 0 and list 1 containing the reference blocks and motion vectors that indicate spatial displacements between the reference blocks and the PU. Motion estimation unit 122 may output the reference indexes and the motion vectors of the PU as the motion information of the PU. Motion compensation unit 124 may generate the predicted video block of the PU based on the reference blocks indicated by the motion information of the PU.

In some instances, motion estimation unit 122 does not output a full set of motion information for a PU to entropy encoding unit 116. Rather, motion estimation unit 122 may signal the motion information of a PU with reference to the motion information of another PU. For example, motion estimation unit 122 may determine that the motion information of the PU is sufficiently similar to the motion information of a neighboring PU. In this example, motion estimation unit 122 may indicate, in a syntax structure associated with the PU, a value that indicates to the video decoder 30 that the PU has the same motion information as the neighboring PU. In another example, motion estimation unit 122 may identify, in a syntax structure associated with the PU, a neighboring PU and a motion vector difference (MVD). The motion vector difference indicates a difference between the motion vector of the PU and the motion vector of the indicated neighboring PU. The video decoder 30 may use the motion vector of the indicated neighboring PU and the motion vector difference to determine the motion vector of the PU. By referring to the motion information of a first PU when signaling the motion information of a second PU, the video encoder 20 may be able to signal the motion information of the second PU using fewer bits.

As part of performing an encoding operation on a CU, intra prediction unit 126 may perform intra prediction on PUs of the CU. Intra prediction may provide spatial compression. When intra prediction unit 126 performs intra prediction on a PU, intra prediction unit 126 may generate prediction data for the PU based on decoded samples of other PUs in the same picture. The prediction data for the PU may include a predicted video block and various syntax elements. Intra prediction unit 126 may perform intra prediction on PUs in I slices, P slices, and B slices.

To perform intra prediction on a PU, intra prediction unit 126 may use multiple intra prediction modes to generate multiple sets of prediction data for the PU. When intra prediction unit 126 uses an intra prediction mode to generate a set of prediction data for the PU, intra prediction unit 126 may extend samples from video blocks of neighboring PUs across the video block of the PU in a direction and/or gradient associated with the intra prediction mode. The neighboring PUs may be above, above and to the right, above and to the left, or to the left of the PU, assuming a left-to-right, top-to-bottom encoding order for PUs, CUs, and treeblocks. Intra prediction unit 126 may use various numbers of intra prediction modes, e.g., 33 directional intra prediction modes, depending on the size of the PU.

Prediction processing unit 100 may select the prediction data for a PU from among the prediction data generated by motion compensation unit 124 for the PU or the prediction data generated by intra prediction unit 126 for the PU. In some examples, prediction processing unit 100 selects the prediction data for the PU based on rate/distortion metrics of the sets of prediction data.

If prediction processing unit 100 selects prediction data generated by intra prediction unit 126, prediction processing unit 100 may signal the intra prediction mode that was used to generate the prediction data for the PUs, e.g., the selected intra prediction mode. Prediction processing unit 100 may signal the selected intra prediction mode in various ways. For example, it may be probable that the selected intra prediction mode is the same as the intra prediction mode of a neighboring PU. In other words, the intra prediction mode of the neighboring PU may be the most probable mode for the current PU. Thus, prediction processing unit 100 may generate a syntax element to indicate that the selected intra prediction mode is the same as the intra prediction mode of the neighboring PU.

As discussed above, the video encoder 20 may include inter-layer prediction unit 128. Inter-layer prediction unit 128 is configured to predict a current block (e.g., a current block in the EL) using one or more different layers that are available in SHVC (e.g., a base or reference layer). Such prediction may be referred to as inter-layer prediction. Inter-layer prediction unit 128 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer.

After prediction processing unit 100 selects the prediction data for PUs of a CU, residual generation unit 102 may generate residual data for the CU by subtracting (e.g., indicated by the minus sign) the predicted video blocks of the PUs of the CU from the video block of the CU. The residual data of a CU may include 2D residual video blocks that correspond to different sample components of the samples in the video block of the CU. For example, the residual data may include a residual video block that corresponds to differences between luminance components of samples in the predicted video blocks of the PUs of the CU and luminance components of samples in the original video block of the CU. In addition, the residual data of the CU may include residual video blocks that correspond to the differences between chrominance components of samples in the predicted video blocks of the PUs of the CU and the chrominance components of the samples in the original video block of the CU.

Prediction processing unit 100 may perform quadtree partitioning to partition the residual video blocks of a CU into sub-blocks. Each undivided residual video block may be associated with a different TU of the CU. The sizes and positions of the residual video blocks associated with TUs of a CU may or may not be based on the sizes and positions of video blocks associated with the PUs of the CU. A quadtree structure known as a "residual quad tree" (RQT) may include nodes associated with each of the residual video blocks. The TUs of a CU may correspond to leaf nodes of the RQT.

Transform processing unit 104 may generate one or more transform coefficient blocks for each TU of a CU by applying one or more transforms to a residual video block associated with the TU. Each of the transform coefficient blocks may be a 2D matrix of transform coefficients. Transform processing unit 104 may apply various transforms to the residual video block associated with a TU. For example, transform processing unit 104 may apply a discrete cosine transform (DCT), a directional transform, or a conceptually similar transform to the residual video block associated with a TU.

After transform processing unit 104 generates a transform coefficient block associated with a TU, quantization unit 106 may quantize the transform coefficients in the transform coefficient block. Quantization unit 106 may quantize a transform coefficient block associated with a TU of a CU based on a QP value associated with the CU.

The video encoder 20 may associate a QP value with a CU in various ways. For example, the video encoder 20 may perform a rate-distortion analysis on a treeblock associated with the CU. In the rate-distortion analysis, the video encoder 20 may generate multiple coded representations of the treeblock by performing an encoding operation multiple times on the treeblock. The video encoder 20 may associate different QP values with the CU when the video encoder 20 generates different encoded representations of the treeblock. The video encoder 20 may signal that a given QP value is associated with the CU when the given QP value is associated with the CU in a coded representation of the treeblock that has a lowest bitrate and distortion metric.

Inverse quantization unit 108 and inverse transform unit 110 may apply inverse quantization and inverse transforms to the transform coefficient block, respectively, to reconstruct a residual video block from the transform coefficient block. Reconstruction unit 112 may add the reconstructed residual video block to corresponding samples from one or more predicted video blocks generated by prediction processing unit 100 to produce a reconstructed video block associated with a TU. By reconstructing video blocks for each TU of a CU in this way, the video encoder 20 may reconstruct the video block of the CU.

After reconstruction unit 112 reconstructs the video block of a CU, filter unit 113 may perform a deblocking operation to reduce blocking artifacts in the video block associated with the CU. After performing the one or more deblocking operations, filter unit 113 may store the reconstructed video block of the CU in decoded picture buffer 114. Motion estimation unit 122 and motion compensation unit 124 may use a reference picture that contains the reconstructed video block to perform inter prediction on PUs of subsequent pictures. In addition, intra prediction unit 126 may use reconstructed video blocks in decoded picture buffer 114 to perform intra prediction on other PUs in the same picture as the CU.

Entropy encoding unit 116 may receive data from other functional components of the video encoder 20. For example, entropy encoding unit 116 may receive transform coefficient blocks from quantization unit 106 and may receive syntax elements from prediction processing unit 100. When entropy encoding unit 116 receives the data, entropy encoding unit 116 may perform one or more entropy encoding operations to generate entropy encoded data. For example, the video encoder 20 may perform a CAVLC operation, a CABAC operation, a variable-to-variable (V2V) length coding operation, a syntax-based context-adaptive binary arithmetic coding (SBAC) operation, a Probability Interval Partitioning Entropy (PIPE) coding operation, or another type of entropy encoding operation on the data. Entropy encoding unit 116 may output a bitstream that includes the entropy encoded data.

As part of performing an entropy encoding operation on data, entropy encoding unit 116 may select a context model. If entropy encoding unit 116 is performing a CABAC operation, the context model may indicate estimates of probabilities of particular bins having particular values. In the context of CABAC, the term "bin" is used to refer to a bit of a binarized version of a syntax element.

Video Decoder

Figure 3:
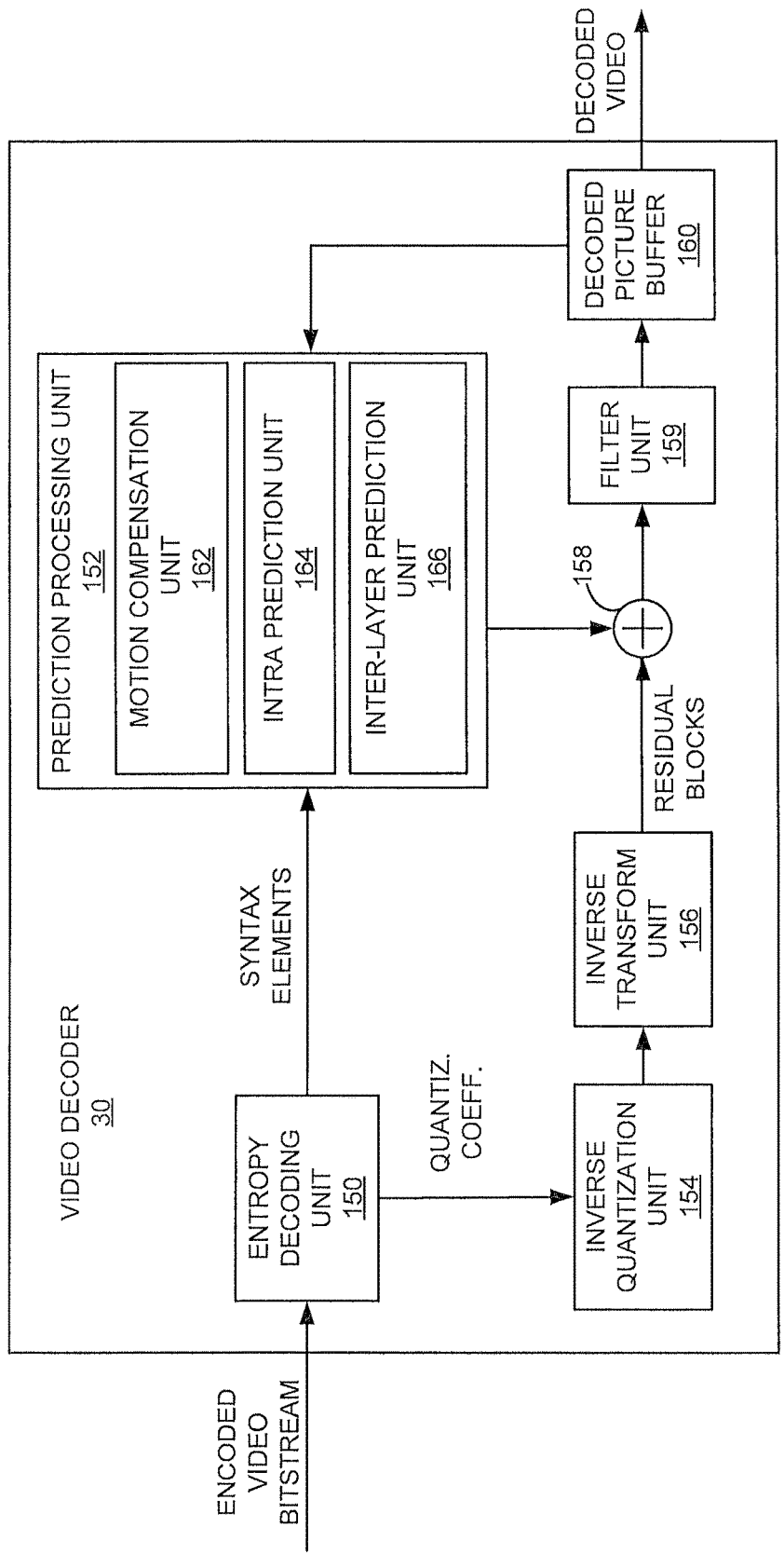
FIG. 3 is a block diagram illustrating an example of a video decoder that may implement techniques in accordance with aspects described in this disclosure.

FIG. 3 is a block diagram illustrating an example of the video decoder 30 that may implement techniques in accordance with aspects described in this disclosure. The video decoder 30 may be configured to process a single layer of a video frame, such as for HEVC. Further, the video decoder 30 may be configured to perform any or all of the techniques of this disclosure. In some examples, the techniques described in this disclosure may be shared among the various components of the video decoder 30. In some examples, additionally or alternatively, a processor (not shown) may be configured to perform any or all of the techniques described in this disclosure.

For purposes of explanation, this disclosure describes the video decoder 30 in the context of HEVC coding. However, the techniques of this disclosure may be applicable to other coding standards or methods. The example depicted in FIG. 3 is for a single layer codec. However, in certain implementations, some or all of the video decoder 30 may be duplicated for processing of a multi-layer codec.

In the example of FIG. 3, the video decoder 30 includes a plurality of functional components. The functional components of the video decoder 30 include an entropy decoding unit 150, a prediction processing unit 152, an inverse quantization unit 154, an inverse transform unit 156, a reconstruction unit 158, a filter unit 159, and a decoded picture buffer 160. Prediction processing unit 152 includes a motion compensation unit 162, an intra prediction unit 164, and an inter-layer prediction unit 166. In some examples, the video decoder 30 may perform a decoding pass generally reciprocal to the encoding pass described with respect to video encoder 20 of FIG. 2. In other examples, the video decoder 30 may include more, fewer, or different functional components.

The video decoder 30 may receive a bitstream that comprises encoded video data. The bitstream may include a plurality of syntax elements. When the video decoder 30 receives the bitstream, entropy decoding unit 150 may perform a parsing operation on the bitstream. As a result of performing the parsing operation on the bitstream, entropy decoding unit 150 may extract syntax elements from the bitstream. As part of performing the parsing operation, entropy decoding unit 150 may entropy decode entropy encoded syntax elements in the bitstream. Prediction processing unit 152, inverse quantization unit 154, inverse transform unit 156, reconstruction unit 158, and filter unit 159 may perform a reconstruction operation that generates decoded video data based on the syntax elements extracted from the bitstream.

As discussed above, the bitstream may comprise a series of NAL units. The NAL units of the bitstream may include video parameter set NAL units, sequence parameter set NAL units, picture parameter set NAL units, SEI NAL units, and so on. As part of performing the parsing operation on the bitstream, entropy decoding unit 150 may perform parsing operations that extract and entropy decode sequence parameter sets from sequence parameter set NAL units, picture parameter sets from picture parameter set NAL units, SEI data from SEI NAL units, and so on.

In addition, the NAL units of the bitstream may include coded slice NAL units. As part of performing the parsing operation on the bitstream, entropy decoding unit 150 may perform parsing operations that extract and entropy decode coded slices from the coded slice NAL units. Each of the coded slices may include a slice header and slice data. The slice header may contain syntax elements pertaining to a slice. The syntax elements in the slice header may include a syntax element that identifies a picture parameter set associated with a picture that contains the slice. Entropy decoding unit 150 may perform entropy decoding operations, such as CABAC decoding operations, on syntax elements in the coded slice header to recover the slice header.

As part of extracting the slice data from coded slice NAL units, entropy decoding unit 150 may perform parsing operations that extract syntax elements from coded CUs in the slice data. The extracted syntax elements may include syntax elements associated with transform coefficient blocks. Entropy decoding unit 150 may then perform CABAC decoding operations on some of the syntax elements.

After entropy decoding unit 150 performs a parsing operation on a non-partitioned CU, the video decoder 30 may perform a reconstruction operation on the non-partitioned CU. To perform the reconstruction operation on a non-partitioned CU, the video decoder 30 may perform a reconstruction operation on each TU of the CU. By performing the reconstruction operation for each TU of the CU, the video decoder 30 may reconstruct a residual video block associated with the CU.

As part of performing a reconstruction operation on a TU, inverse quantization unit 154 may inverse quantize, e.g., de-quantize, a transform coefficient block associated with the TU. Inverse quantization unit 154 may inverse quantize the transform coefficient block in a manner similar to the inverse quantization processes proposed for HEVC or defined by the H.264 decoding standard. Inverse quantization unit 154 may use a quantization parameter QP calculated by the video encoder 20 for a CU of the transform coefficient block to determine a degree of quantization and, likewise, a degree of inverse quantization for inverse quantization unit 154 to apply.

After inverse quantization unit 154 inverse quantizes a transform coefficient block, inverse transform unit 156 may generate a residual video block for the TU associated with the transform coefficient block. Inverse transform unit 156 may apply an inverse transform to the transform coefficient block in order to generate the residual video block for the TU. For example, inverse transform unit 156 may apply an inverse DCT, an inverse integer transform, an inverse Karhunen-Loeve transform (KLT), an inverse rotational transform, an inverse directional transform, or another inverse transform to the transform coefficient block. In some examples, inverse transform unit 156 may determine an inverse transform to apply to the transform coefficient block based on signaling from the video encoder 20. In such examples, inverse transform unit 156 may determine the inverse transform based on a signaled transform at the root node of a quadtree for a treeblock associated with the transform coefficient block. In other examples, inverse transform unit 156 may infer the inverse transform from one or more coding characteristics, such as block size, coding mode, or the like. In some examples, inverse transform unit 156 may apply a cascaded inverse transform.

In some examples, motion compensation unit 162 may refine the predicted video block of a PU by performing interpolation based on interpolation filters. Identifiers for interpolation filters to be used for motion compensation with sub-sample precision may be included in the syntax elements. Motion compensation unit 162 may use the same interpolation filters used by the video encoder 20 during generation of the predicted video block of the PU to calculate interpolated values for sub-integer samples of a reference block. Motion compensation unit 162 may determine the interpolation filters used by the video encoder 20 according to received syntax information and use the interpolation filters to produce the predicted video block.

If a PU is encoded using intra prediction, intra prediction unit 164 may perform intra prediction to generate a predicted video block for the PU. For example, intra prediction unit 164 may determine an intra prediction mode for the PU based on syntax elements in the bitstream. The bitstream may include syntax elements that intra prediction unit 164 may use to determine the intra prediction mode of the PU.

In some instances, the syntax elements may indicate that intra prediction unit 164 is to use the intra prediction mode of another PU to determine the intra prediction mode of the current PU. For example, it may be probable that the intra prediction mode of the current PU is the same as the intra prediction mode of a neighboring PU. In other words, the intra prediction mode of the neighboring PU may be the most probable mode for the current PU. Hence, in this example, the bitstream may include a small syntax element that indicates that the intra prediction mode of the PU is the same as the intra prediction mode of the neighboring PU. Intra prediction unit 164 may then use the intra prediction mode to generate prediction data (e.g., predicted samples) for the PU based on the video blocks of spatially neighboring PUs.

As discussed above, the video decoder 30 may also include inter-layer prediction unit 166. Inter-layer prediction unit 166 is configured to predict a current block (e.g., a current block in the enhancement layer) using one or more different layers that are available in SHVC (e.g., a base or reference layer). Such prediction may be referred to as inter-layer prediction. Inter-layer prediction unit 166 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer. Each of the inter-layer prediction schemes is discussed below in greater detail.

Reconstruction unit 158 may use the residual video blocks associated with TUs of a CU and the predicted video blocks of the PUs of the CU, e.g., either intra prediction data or inter-prediction data, as applicable, to reconstruct the video block of the CU. Thus, the video decoder 30 may generate a predicted video block and a residual video block based on syntax elements in the bitstream and may generate a video block based on the predicted video block and the residual video block.

After reconstruction unit 158 reconstructs the video block of the CU, filter unit 159 may perform a deblocking operation to reduce blocking artifacts associated with the CU. After filter unit 159 performs a deblocking operation to reduce blocking artifacts associated with the CU, the video decoder 30 may store the video block of the CU in decoded picture buffer 160. Decoded picture buffer 160 may provide reference pictures for subsequent motion compensation, intra prediction, and presentation on a display device, such as display device 32 of FIG. 1A or 1B. For instance, the video decoder 30 may perform, based on the video blocks in decoded picture buffer 160, intra prediction or inter prediction operations on PUs of other CUs.

Intra Block Copy (IBC) Mode

Intra block copy (IBC) mode is a coding mode that allows a current block (e.g., a coding unit, a prediction unit, etc.) to be predicted based on similar reconstructed blocks within the same picture that includes the current block. A block vector pointing to the location of the predictor block within the current picture may be signaled in the bitstream in connection with a current block that is coded in IBC mode.

Unification of IBC Mode and Inter Mode

In some implementations, the IBC mode is unified with the inter mode (e.g., a coding mode that allows a current block to be predicted based on similar reconstructed blocks in a picture other than the current picture including the current block). Since both the IBC mode and the inter mode involve vectors identifying the location of the predictor blocks, the IBC mode can be implemented using a reference picture list that includes the current picture. For example, by adding the current picture to the reference picture list associated with a given slice, using the same reference picture list, one block in the given slice can be coded in IBC mode by referring to the current picture in the reference picture list, and another block in the given slice can be coded in inter mode by referring to a temporal picture in the reference picture list.

Reference Picture Marking in IBC Mode

In some implementations of the IBC mode, before decoding the current slice, the current picture is marked as a long-term reference picture. Then, the current picture is marked as a short-term reference picture after the decoding of the current picture is complete.

Difference Between IBC Mode and Inter Mode

The signaling and coding methods associated with the IBC mode, including merge mode signaling, advanced motion vector prediction (AMVP) signaling, AMVP derivation, and motion vector difference (MVD) coding, may be identical to those associated with the inter mode. In some embodiments, unlike in the inter mode, the motion vectors for the IBC mode may be required to be integer motion vectors. In some embodiments, motion vectors for only luma components, but not chroma components, may be required to be integer motion vectors. Alternatively, motion vectors for only chroma components, but not luma components, may be required to be integer motion vectors.

In some cases, a block coded in IBC mode can be differentiated from conventional inter-coded blocks by checking the corresponding reference picture. If a block uses only the current picture as a reference picture, then the block is coded in IBC mode. If the block uses any picture other than the current picture including the block as a reference picture, the block is coded in inter mode.

Signaling of Whether IBC Mode is Allowed

In some embodiments, a flag indicative of whether the IBC mode is allowed to be used for coding a block may be signaled in the bitstream (e.g., in the VPS, SPS, PPS, slice header, etc.). Such a flag may indicate whether the current picture including the block to be coded (e.g., encoded or decoded) can be used as a reference picture to code the block (or code itself). Alternatively or additionally, such a flag may indicate whether the current picture can be added to the reference picture list of the current picture. For example, the flag may be called "curr_pic_as_ref_enabled_flag" or "curr_pic_ref_enable_flag".

Reference Picture List Construction

Tables 1-3 illustrate an example process for constructing the reference picture list of the current slice including the current block to be coded. For example, the variable NumPicTotalCurr may be indicative of the total number of pictures that are available for use as reference for prediction of the current picture. In some embodiments, the variable NumPicTotalCurr is indicative of the total number of unique pictures that are available for use as reference for prediction of the current picture. The variable NumPicTotalCurr may be derived as follows:

TABLE 1

Derivation of NumPicTotalCurr

NumPicTotalCurr = 0
for( i = 0; i < NumNegativePics[ CurrRpsIdx ]; i++ )
    if( UsedByCurrPicS0[ CurrRpsIdx ][ i ] )
        NumPicTotalCurr++
for( i = 0; i < NumPositivePics[ CurrRpsIdx ]; i++)
    if( UsedByCurrPicS1[ CurrRpsIdx ][ i ] )
        NumPicTotalCurr++
for( i = 0; i < num_long_term_sps + num_long_term_pics; i++ )
    if( UsedByCurrPicLt[ i ] )
        NumPicTotalCurr++
if( curr_pic_as_ref_enabled_flag )
    NumPicTotalCurr++

The variable NumRpsCurrTempList0 may be set equal to Max (num_ref_idx_l0_active_minus1+1, NumPicTotalCurr), where num_ref_idx_l0_active_minus1+1 represents the number of reference pictures specified in the slice (e.g., the number of reference pictures referred to by the blocks in the slice). num_ref_idx_l0_active_minus1 may be signaled in the slice segment header of a given slice. In some embodiments, num_ref_idx_l0_active_minus1+1 is less than NumPicTotalCurr. Alternatively, num_ref_idx_l0_active_minus1+1 may be greater than NumPicTotalCurr. The variable NumRpsCurrTempList0 may indicate the size of the temporary reference picture list (e.g., RefPicListTemp0) to be used for generating the reference picture list (e.g., RefPicList0) for the slice. The temporary list RefPicListTemp0 may be constructed as follows:

TABLE 2

Construction of RefPicListTemp0 rIdx = 0
while( rIdx < NumRpsCurrTempList0 ) {
    for( i = 0; i < NumPocStCurrBefore && rIdx < NumRpsCurrTempList0; rIdx++, i++ )
        RefPicListTemp0[ rIdx ] = RefPicSetStCurrBefore[ i ]
    for( i = 0; i < NumPocStCurrAfter && rIdx < NumRpsCurrTempList0; rIdx++, i++ )
        RefPicListTemp0[ rIdx ] = RefPicSetStCurrAfter[ i ]
    for( i = 0; i < NumPocLtCurr && rIdx < NumRpsCurrTempList0; rIdx++, i++ )
        RefPicListTemp0[ rIdx ] = RefPicSetLtCurr[ i ]
    if( curr_pic_as_ref_enabled_flag )
        RefPicListTemp0[ rIdx++ ] = currPic
}

Based on the temporary list RefPicListTemp0 constructed above, the reference picture list RefPicList0 associated with the slice may be constructed as follows:

TABLE 3

Construction of RefPicList0 for( rIdx = 0; rIdx <= num_ref_idx_l0_active_minus1; rIdx++)
RefPicList0[ rIdx ] = ref_pic_list_modification_flag_l0 ?
    RefPicListTemp0[ list_entry_l0[ rIdx ] ] : RefPicListTemp0[ rIdx ]

The flag ref_pic_list_modification_flag_l0 may be indicative of whether the reference picture list (e.g., list 0) is specified explicitly (e.g., by a list of index values in list_entry_l0[ ] signaled in the bitstream) or determined implicitly (e.g., in the same order as the temporary list RefPicListTemp0 or based on values other than list_entry_l0 values).

Addition of Current Picture to Reference Picture List

In some implementations of the IBC mode, the current picture is mandatorily added to the reference picture list associated with a slice including the current block to be coded, when reference picture list modification (RPLM) is not present. For example, reference picture list modification may be used to reorder reference pictures in the reference picture list. Table 4 illustrates an example process for adding the current picture to the reference picture list:

TABLE 4

Adding CurrPic as the last element of RefPicList0 if( curr_pic_as_ref_enabled_flag &&
    !ref_pic_list_modification_flag_l0)
    RefPicList0[ num_ref_idx_l0_active_minus1] = CurrPic Current Picture as Last Element As illustrated in Table 2, in the WHILE loop of the RefPicListTemp0 construction process, the same reference picture can be added to the temporary list RefPicListTemp0 multiple times when NumPicTotalCurr is smaller then num_ref_idx_l0_active_minus1+1. In such a case, the current picture, added in the IF clause of the RefPicListTemp0 construction process, is added to the temporary list RefPicListTemp0 at least once.

Figure 4:
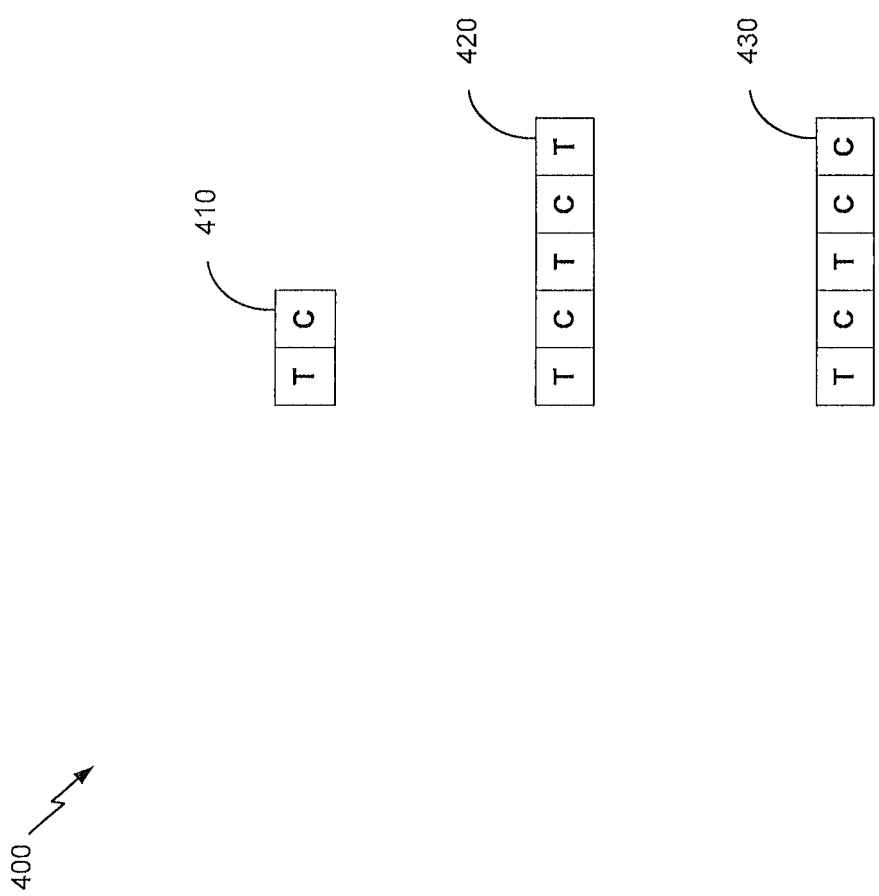
FIG. 4 is an example reference picture list construction process in accordance with aspects described in this disclosure.

FIG. 4 illustrates the reference picture list (e.g., RefPicList0) construction process 400. FIG. 4 shows a list 410 of pictures that are available for use as reference for prediction of the current picture, a reference picture list 420 prior to the adding of the current picture to the reference picture list constructed as described in Table 3, and a reference picture list 430 after the current picture is added to the constructed reference picture list according to Table 4.

In the example of FIG. 4, the variable NumPicTotalCurr is equal to 2, meaning that the number of pictures available for use as reference for prediction of the current picture is 2 (which may include the current picture C as well as a temporal picture T, as illustrated in FIG. 4). In the example of FIG. 4, the variable num_ref_idx_l0_active_minus1+1 is equal to 5, meaning that the number of pictures referred to by the slice is 5. Thus, in the example of FIG. 4, the variable NumRpsCurrTempList0, which is the greater of NumPicTotalCurr and num_ref_idx_l0_active_minus1+1, is equal to 5. Accordingly, the reference picture lists 420 and 430 both include 5 pictures.

Repeating Pattern in Reference Picture List

In the example of FIG. 4, the reference picture list 420 comprises {T, C, T, C, T}, and the reference picture list 430 comprises {T, C, T, C, C}, with the last instance of temporal picture T replaced with an instance of the current picture C. However, in some implementations, there may be a good reason for the reference picture list to include a repeated sequence of reference pictures (e.g., T, C, T, C . . . ). For example, the repeated sequence of reference pictures may be used for weighted prediction. In the example of FIG. 4, the repeated sequence is disrupted by the current picture added to the end of the reference picture list. Thus, in such cases, it may be desirable to refrain from disrupting the repeated sequence of reference pictures by refraining from automatically replacing a reference picture in the reference picture list with the current picture (e.g., replacing the last picture in the reference picture list with the current picture), if doing so would disrupt the repeated sequence of reference pictures in the reference picture list.

In some embodiments, if the current picture is already included in the reference picture list, the coder refrains from replacing a reference picture with the current picture in the reference picture list. For example, in some embodiments, the coder replaces the last reference picture in the reference picture list with the current picture, unless the current picture is already included in the reference picture list. In some embodiments, if the total number of pictures available for use as reference for prediction of the current picture (e.g., NumPicTotalCurr) is not greater than (e.g., less than or equal to) the number of pictures referred to by the blocks in the slice (e.g., num_ref_idx_l0_active_minus1+1), the coder refrains from replacing a reference picture in the reference picture list with the current picture. In one example, the coder refrains from setting the last element of the reference picture list to the current picture. Table 5 illustrates an example process for adding the current picture to the reference picture list:

TABLE 5

Refraining from adding CurrPic if CurrPic is in the reference picture list if( curr_pic_as_ref_enabled_flag &&
!ref_pic_list_modification_flag_l0 && NumPicTotalCurr > num_ref_idx_l0_active_minus1 + 1 )
    RefPicList0[ num_ref_idx_l0_active_minus1] = CurrPic In some embodiments, the coder may determine whether NumRpsCurrTempList0 is greater than num_ref_idx_l0_active_minus1+1, and refrain from replacing a reference picture in the reference picture list with the current picture if NumRpsCurrTempList0 is not greater than (e.g., less than or equal to) num_ref_idx_l0_active_minus1+1. In some embodiments, the coder may determine whether NumRpsCurrTempList0 is equal to num_ref_idx_l0_active_minus1+1, and refrain from replacing a reference picture in the reference picture list with the current picture if NumRpsCurrTempList0 is equal to num_ref_idx_l0_active_minus1+1.

In some embodiments, the coder may determine whether num_ref_idx_l0_active_minus1+1 is greater than NumPicTotalCurr, and refrain from replacing a reference picture in the reference picture list with the current picture if num_ref_idx_l0_active_minus1+1 is greater than NumPicTotalCurr. In some embodiments, the coder may determine whether num_ref_idx_l0_active_minus1+1 greater than NumRpsCurrTempList0, and refrain from replacing a reference picture in the reference picture list with the current picture if num_ref_idx_l0_active_minus1+1 greater than NumRpsCurrTempList0.

Example Process for Adding Current Picture to Reference Picture List

Figure 5:
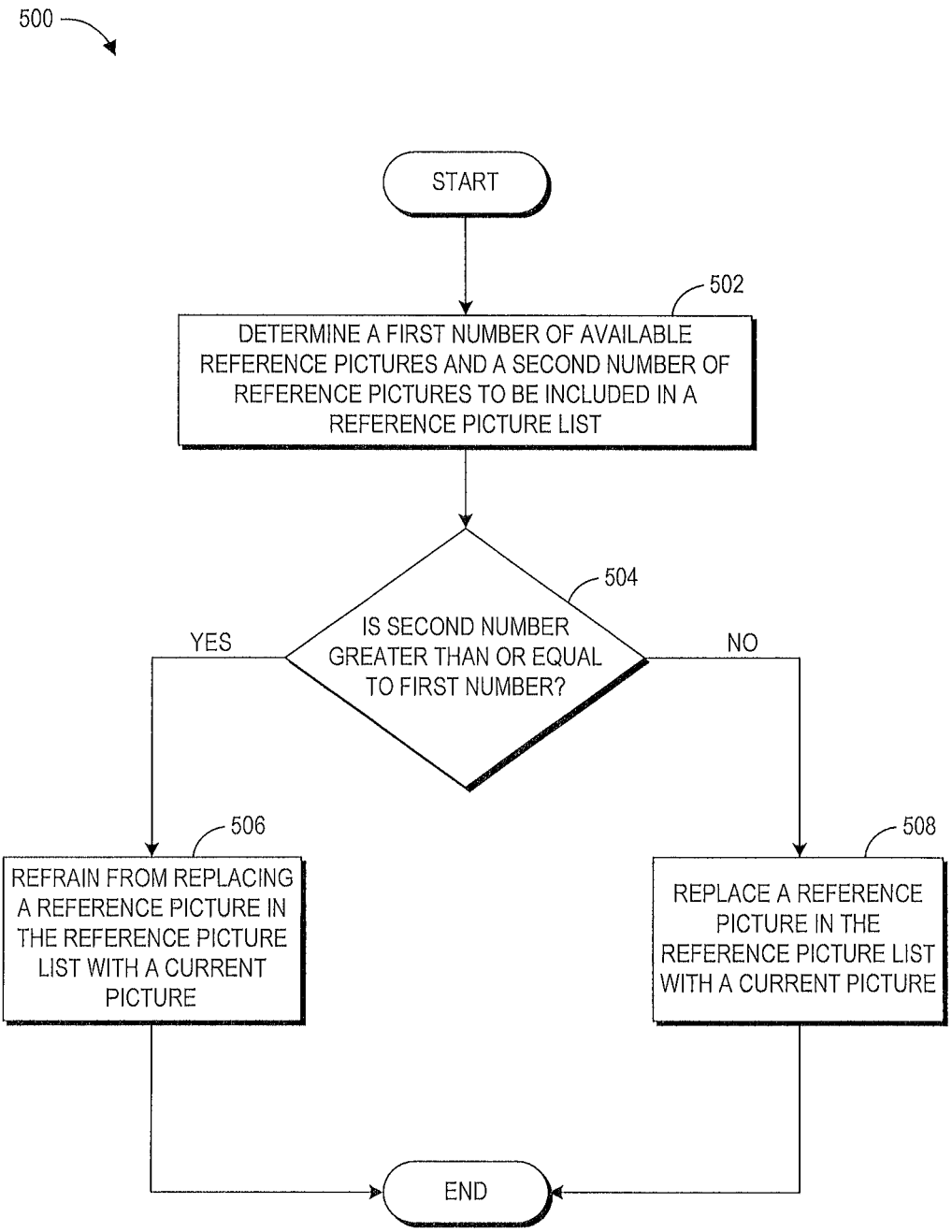
FIG. 5 is a flowchart illustrating a method for constructing a reference picture list in accordance with aspects of the present disclosure.

FIG. 5 is a flowchart illustrating a method 500 for constructing a reference picture list associated with a slice including a current block in accordance with aspects of the present disclosure. The steps illustrated in FIG. 5 may be performed by a video encoder (e.g., the video encoder 20), a video decoder (e.g., the video decoder 30), or any other component. For convenience, method 500 is described as performed by a video coder (also simply referred to as coder), which may be the video encoder 20, the video decoder 30, or another component.

At block 502, the coder determines a first number representative of a total number of reference pictures available for prediction in at least one of inter mode or intra block copy mode and (ii) a second number representative of a total number of reference pictures to be included in a reference picture list. In some embodiments, the reference pictures available for prediction in at least one of inter mode or intra block copy mode include all decoded pictures. In another embodiment, the reference pictures include all decoded pictures in the decoded picture buffer. In another embodiment, the reference pictures include all reference pictures available for use in predicting a block in the current picture in inter mode and the current picture. In yet another embodiment, the reference pictures include (i) a total number of short-term reference pictures available for predicting the current picture and precede the current picture in output order (e.g., indicated by the NumPocStCurrBefore), (ii) a total number of short-term reference pictures available for predicting the current picture and follow the current picture in output order (e.g., indicated by the NumPocStCurrAfter), (iii) a total number of long-term reference pictures available for predicting the current picture (e.g., indicated by the NumPocLtCurr), and (iv) the current picture. In some of such embodiments, whether the current picture is included in the total number is based on whether the current picture is allowed to be used for predicting a block in the current picture (e.g., indicated by the value of curr_pic_as_ref_enabled_flag). In some embodiments, the first number is indicated by the variable NumPicTotalCurr of HEVC and the second number is indicated by the variable num_ref_idx_l0_active_minus1+1 of HEVC. Although not illustrated in FIG. 5, prior to block 502, the coder may construct the reference picture list in accordance with the processes illustrated in Tables 1-3.

At block 504, the coder determines whether the second number is greater than or equal to the first number. If the coder determines that the second number is greater than or equal to the first number, the method 500 proceeds to block 506. Otherwise, the method 500 proceeds to block 508.

At block 506, the coder refrains from replacing a reference picture in the reference picture list with a current picture to be predicted. In some embodiments, the coder refrains from replacing a reference picture in the last position of the reference picture list with the current picture. In another embodiment, the coder refrains from replacing a reference picture in the last position of the reference picture list that is not the current picture with the current picture.

At block 508, the coder replaces a reference picture in the reference picture list with the current picture. In some embodiments, the coder replaces a reference picture in the last position of the reference picture list with the current picture. In another embodiment, the coder replaces a reference picture in the last position of the reference picture list that is not the current picture with the current picture. In another embodiment, the coder replaces a reference picture in the last position of the reference picture list with the current picture regardless of whether the reference picture is the current picture or not.

Although not illustrated in FIG. 5, the coder may determine a prediction block for a current block in the current picture using the reference picture list. Further, the coder may encode the current block based on the prediction block. Alternatively or additionally, the coder may decode the current block based on the prediction block.

In some embodiments, the coder is included in an apparatus that also includes a camera configured to capture the current picture (or image data or video data corresponding to the current picture). In some embodiments, the coder is included in an apparatus that also includes a display configured to display the current picture (or image data or video data corresponding to the current picture).

Other Reference Picture Lists

One or more techniques of reference picture this construction are described herein based on reference picture list 0 as an example. However similar techniques may be extended to other types of reference picture lists. For example, the techniques of this disclosure may be extended to reference picture list 1 by replacing list0 or l0 with list 1 or l1, respectively.

Other Considerations

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, and algorithm steps described in connection with the embodiments disclosed herein may be implemented as electronic hardware, computer software, or combinations of both. To clearly illustrate this interchangeability of hardware and software, various illustrative components, blocks, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as devices or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software or hardware configured for encoding and decoding, or incorporated in a combined video encoder-decoder (CODEC). Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Although the foregoing has been described in connection with various different embodiments, features or elements from one embodiment may be combined with other embodiments without departing from the teachings of this disclosure. However, the combinations of features between the respective embodiments are not necessarily limited thereto. Various embodiments of the disclosure have been described. These and other embodiments are within the scope of the following claims.

What is claimed is:

1. A method for constructing a reference picture list, the method comprising:
   determining, by one or more processors of a video coder, (i) a first number representative of a total number of reference pictures available for prediction in at least one of inter mode or intra block copy mode and (ii) a second number representative of a total number of reference pictures to be included in a reference picture list for a current picture to be predicted;
   determining, by the one or more processors and based on whether the second number is greater than or equal to the first number, whether or not to replace a reference picture in the reference picture list with the current picture;
   selectively refraining from or replacing, based on the determination of whether or not to replace, the reference picture in the reference picture list with the current picture; and
   predicting, based on the reference picture list, samples of the current picture.

2. The method of claim 1, wherein selectively refraining from or replacing comprises:
   replacing, where the second number is not greater than or equal to the first number, a reference picture in the reference picture list with the current picture.

3. The method of claim 1, further comprising determining the first number as a sum of (i) a total number of reference pictures available for use in predicting a block in the current picture in inter mode and (ii) a value based on whether the current picture is allowed to be used for predicting a block in the current picture.

4. The method of claim 1, further comprising determining the first number as a sum of (i) a total number of short-term reference pictures available for predicting the current picture and precede the current picture in output order, (ii) a total number of short-term reference pictures available for predicting the current picture and follow the current picture in output order, (iii) a total number of long-term reference pictures available for predicting the current picture, and (iv) a value based on whether the current picture is allowed to be used for predicting a block in the current picture.

5. The method of claim 1, further comprising, in response to determining that the reference picture list includes the current picture at a position other than the last position of the reference picture list, refraining from replacing a reference picture at the last position of the reference picture list with the current picture.

6. The method of claim 1, further comprising, in response to determining that the reference picture list includes a reference picture sequence including the current picture such that at least a portion of the reference picture sequence is repeated more than once within the reference picture list, refraining from replacing a reference picture in the reference picture list with the current picture.

7. The method of claim 1, wherein the first number is indicated by a value of a variable NumPicTotalCurr in the High Efficiency Video Coding (HEVC) standard.

8. The method of claim 1, wherein the second number is indicated by a sum of a value of a variable num_ref_idx_l0_active_minus1 and 1 in the High Efficiency Video Coding (HEVC) standard.

9. The method of claim 1, wherein the first number is indicated by a value of a variable NumRpsCurrTempList0 in the High Efficiency Video Coding (HEVC) standard.

10. The method of claim 1, further comprising determining a prediction block for a current block in the current picture using the reference picture list.

11. The method of claim 10, further comprising encoding the current block based on the prediction block.

12. The method of claim 10, further comprising decoding the current block based on the prediction block.

13. An apparatus configured to construct a reference picture list, the apparatus comprising:
    a memory configured to store one or more reference pictures; and
    one or more processors in communication with the memory, the one or more processors configured to:
       determine (i) a first number representative of a total number of reference pictures available for prediction in at least one of inter mode or intra block copy mode and (ii) a second number representative of a total number of reference pictures to be included in a reference picture list for a current picture to be predicted;
       determine, based on whether the second number is greater than or equal to the first number, whether or not to replace a reference picture in the reference picture list with the current picture;
       selectively refrain from or replace, based on the determination of whether or not to replace, the reference picture in the reference picture list with the current picture; and
       predict, based on the reference picture list, samples of the current picture.

14. The apparatus of claim 13, wherein, to selectively refrain from or replace, the one or more processors are configured to:
    replace, where the second number is not greater than or equal to the first number, a reference picture in the reference picture list with the current picture.

15. The apparatus of claim 13, wherein the one or more processors are further configured to determine the first number as a sum of (i) a total number of reference pictures available for use in predicting a block in the current picture in inter mode and (ii) a value based on whether the current picture is allowed to be used for predicting a block in the current picture.

16. The apparatus of claim 13, wherein the one or more processors are further configured to determine the first number as a sum of (i) a total number of short-term reference pictures available for predicting the current picture and precede the current picture in output order, (ii) a total number of short-term reference pictures available for predicting the current picture and follow the current picture in output order, (iii) a total number of long-term reference pictures available for predicting the current picture, and (iv) a value based on whether the current picture is allowed to be used for predicting a block in the current picture.

17. The apparatus of claim 13, wherein the one or more processors are further configured to, in response to determining that the reference picture list includes the current picture at a position other than the last position of the reference picture list, refrain from replacing a reference picture at the last position of the reference picture list with the current picture.

18. The apparatus of claim 13, wherein the one or more processors are further configured to, in response to determining that the reference picture list includes a reference picture sequence including the current picture such that at least a portion of the reference picture sequence is repeated more than once within the reference picture list, refrain from replacing a reference picture in the reference picture list with the current picture.

19. The apparatus of claim 13, wherein the first number is indicated by a value of a variable NumPicTotalCurr in the High Efficiency Video Coding (HEVC) standard.

20. The apparatus of claim 13, wherein the second number is indicated by a sum of a value of a variable num_ref_idx_l0_active_minus1 and 1 in the High Efficiency Video Coding (HEVC) standard.

21. The apparatus of claim 13, wherein the first number is indicated by a value of a variable NumRpsCurrTempList0 in the High Efficiency Video Coding (HEVC) standard.

22. The apparatus of claim 13, wherein the one or more processors are further configured to determine a prediction block for a current block in the current picture using the reference picture list.

23. The apparatus of claim 22, wherein the apparatus comprises a video encoder configured to encode the current block based on the prediction block and a camera configured to capture the current picture.

24. The apparatus of claim 22, wherein the apparatus comprises a video decoder configured to decode the current block based on the prediction block and a display configured to display the current picture.

25. A non-transitory physical computer storage comprising code that, when executed, causes an apparatus to:
  determine (i) a first number representative of a total number of reference pictures available for prediction in at least one of inter mode or intra block copy mode and (ii) a second number representative of a total number of reference pictures to be included in a reference picture list for a current picture to be predicted;
  determine, based on whether the second number is greater than or equal to the first number, whether or not to replace a reference picture in the reference picture list with the current picture;
  selectively refrain from or replace, based on the determination of whether or not to replace, the reference picture in the reference picture list with the current picture; and
  predict, based on the reference picture list, samples of the current picture.

26. The non-transitory physical computer storage of claim 25, wherein the code that causes the apparatus to selectively refrain from or replace comprises code that causes the apparatus to:
  replace, where the second number is not greater than or equal to the first number, a reference picture in the reference picture list with the current picture.

27. The non-transitory physical computer storage of claim 25, wherein the code further causes the apparatus to determine the first number as a sum of (i) a total number of short-term reference pictures available for predicting the current picture and precede the current picture in output order, (ii) a total number of short-term reference pictures available for predicting the current picture and follow the current picture in output order, (iii) a total number of long-term reference pictures available for predicting the current picture, and (iv) a value based on whether the current picture is allowed to be used for predicting a block in the current picture.

28. A video coding device configured to construct a reference picture list, the video coding device comprising:
  means for storing one or more reference pictures;
  means for determining (i) a first number representative of a total number of reference pictures available for prediction in at least one of inter mode or intra block copy mode and (ii) a second number representative of a total number of reference pictures to be included in a reference picture list for a current picture to be predicted;
  means for determining, based on whether the second number is greater than or equal to the first number, whether or not to replace a reference picture in the reference picture list with the current picture:
  mean for selectively refraining from or replacing, based on the determination of whether or not to replace, the reference picture in the reference picture list with the current picture; and
  means for predicting, based on the reference picture list, samples of the current picture.

29. The video coding device of claim 28, wherein the means for selectively refraining from or replacing comprise:
  means for replacing, where the second number is not greater than or equal to the first number, a reference picture in the reference picture list with the current picture.

30. The video coding device of claim 28, further comprising means for determining the first number as a sum of (i) a total number of short-term reference pictures available for predicting the current picture and precede the current picture in output order, (ii) a total number of short-term reference pictures available for predicting the current picture and follow the current picture in output order, (iii) a total number of long-term reference pictures available for predicting the current picture, and (iv) a value based on whether the current picture is allowed to be used for predicting a block in the current picture.

* * * * *